3,261,587
BEARING SUPPORT
Robert L. Rowley, Glastonbury, Conn., assignor to United Aircraft Corporation, East Hartford, Conn., a corporation of Delaware
Filed June 24, 1964, Ser. No. 377,677
10 Claims. (Cl. 253—39)

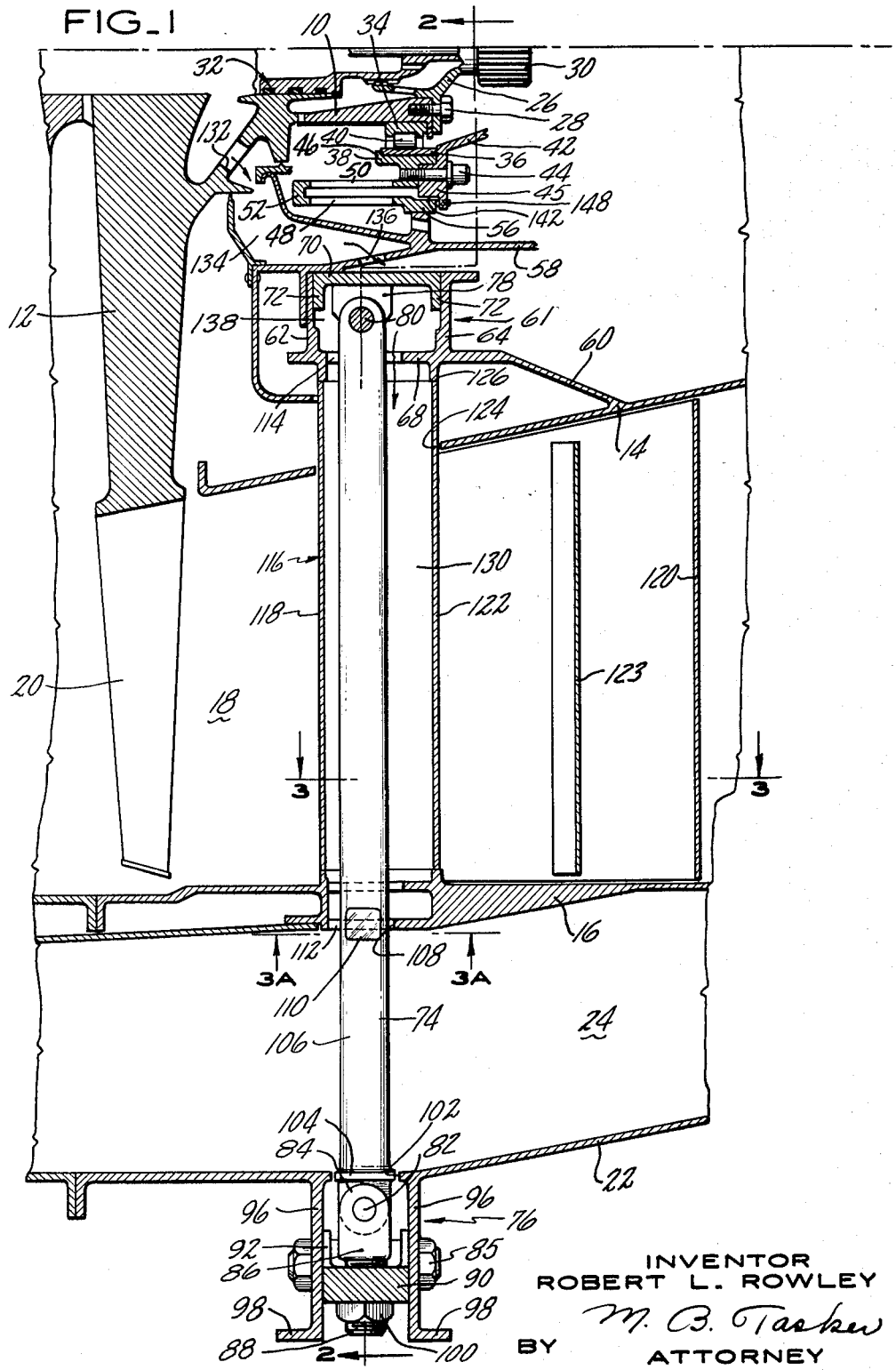

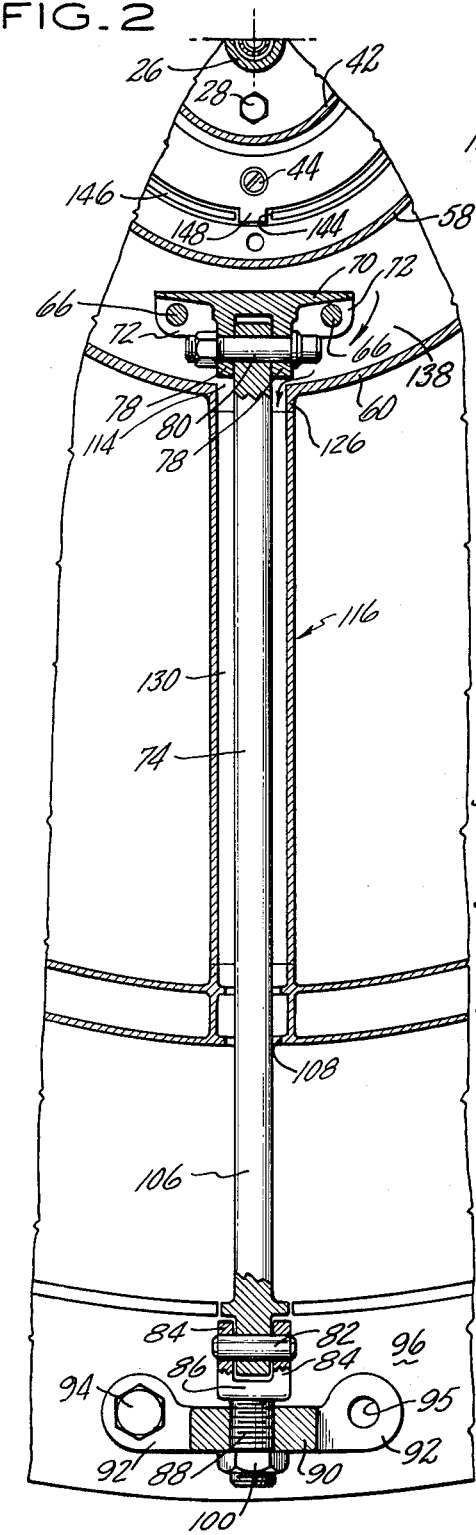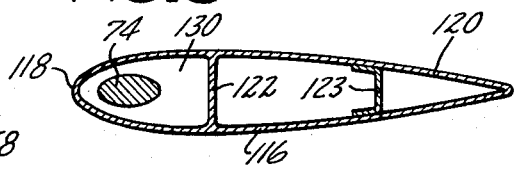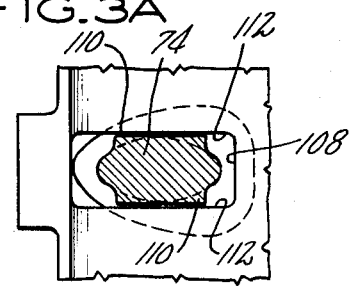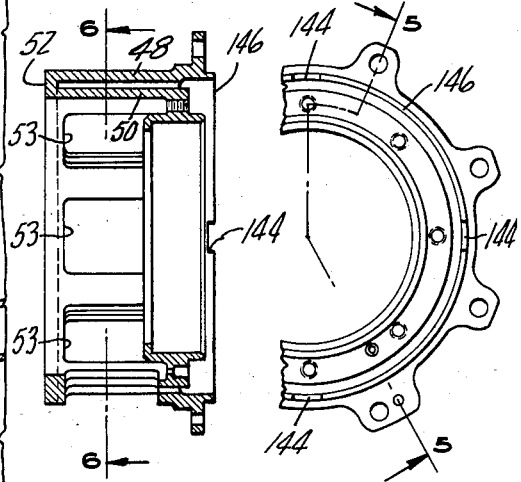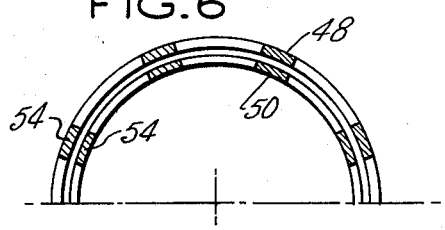
INVENTOR
ROBERT L. ROWLEY
BY M. B. Tasker
ATTORNEY United States Patent Office 3,261,587
Patented July 19, 1966

This invention relates to ducted fan gas turbine engines and particularly to an improved rear bearing and engine case support for such an engine which provides increased fan flow area in the region of the bearing support.

Prior to the advent of the fan engine it had been the practice to support the shaft bearing downstream of the turbine from the outer engine case. In the fan engine, when the fan duct is extended downstream beyond the turbine, the thickening of the outer engine casing required to support the shaft bearing undesirably reduces the cross-sectional area of the fan duct at this point.

It is an object of this invention to support this shaft bearing and engine case which is downstream from the turbine by a plurality of slender radial rods in tension which extend through the outer turbine case and are pivotally connected at their extended ends to the outer fan duct casing in the vicinity of the engine mount ring.

Another object of this invention is to provide cooling means for these bearing support rods where they pass through the turbine exhaust passage.

A further object of this invention is to provide means between the radial bearing support rods and the bearing for achieving the desired bearing spring rate.

A still further object of this invention is the provision of support means for said rods where they pass through the outer turbine case which prevents lateral buckling of the rods under transient compression loads while permitting a certain degree of axial movement thereof due to axial motion of the fan case resulting from differential thermal expansion relative to the engine case.

A still further object of this invention is the provision of means for providing the tension on the radial rods.

Another object of this invention is the provision of radial stop means for the spring means in case of unduly high rotor unbalance.

A further object of this invention is the provision of stop means for limiting the torque wind-up of the spring means in the event of bearing seizure.

A yet further object of this invention is generally to improve ducted fan gas turbine engines.

These and other objects and advantages of the invention will be pointed out in connection with the following detailed description of a preferred embodiment of the invention shown in the accompanying drawings. In these drawings FIG. 1 is a sectional view showing the rear engine bearing and one of the bearing support rods;

FIG. 2 is a sectional view taken on line 2—2 of FIG. 1;

FIG. 3 is a sectional view on line 3—3 of FIG. 1;

FIG. 3A is a detailed sectional view on an enlarged scale taken on line 3A—3A of FIG. 1;

FIG. 4 is a detailed view in elevation of the bearing housing, parts being broken away to facilitate illustration.

FIG. 5 is a sectional view taken on line 5—5 of FIG. 4; and

FIG. 6 is a sectional view on line 6—6 of FIG. 5.

In FIG. 1, 10 is the hollow axial shaft of the gas turbine engine on which the turbine is mounted, the last stage 12 of the turbine being shown somewhat diagrammatically.

The inner casing of the engine is shown at 14 and the outer engine casing is shown at 16. Casings 14 and 16 are concentric with the shaft 10 and between them define the turbine discharge passage 18 downstream of the turbine blades 20, one of which is shown in this figure. A third or outer fan casing 22 is provided concentric with casing 16 which with the latter defines the fan duct 24.

Engine shaft 10 has an accessory drive 26 secured to its down stream end by means of an annular row of cap screws 28 which carries an accessory pinion 30 and oil seals 22. The rear main shaft bearing of the engine has its inner race 34 mounted at the end of the shaft and has its outer race 36 carried by a cylindrical bearing housing 38, roller bearings 40 being provided between the bearing races in the usual manner. A cap 42 is secured to the bearing housing 38 by a circular row of cap screws 44 extending through an outwardly directed flange 45 on the cap. This cap serves to enclose the accessory drive 26 and also, in cooperation with an annular flange 46 on the bearing housing, to position the outer bearing race axially.

The cylindrical bearing housing 38 has two parallel walls 48 and 50 which are connected at their forward end (FIG. 5) to provide a cup-shaped member of considerable depth. Each of said walls has a series of holes 53 therein which extend about the periphery of the sidewalls, leaving peripherally disposed intermediate resilient portions 54 which extend from adjacent the bottom 52 to a point very near the mouth of the cup where the inner sidewall 50 joins the internal bearing supporting flange of housing 38 and where the outer sidewall 48 joins a similar rim flange 56.

The sidewall 48 has its rim 56 connected to a weldment which includes the concentric cylindrical members 58 and 60 on casing 14. Between members 58 and 60 and welded thereto is a rigid ring structure 61 consisting of axially spaced annular members 62 and 64 and an internal bridging member 70 having outwardly extending flanges 72 which are connected to members 62 and 64 by bolts 66 to provide a rigid supporting ring on the weldment. It will be noted that the bearing housing 38 which supports the rear shaft bearing is supported from this stiffening ring 61 carried by the inner casing.

In accordance with this invention means is provided to support this inner ring 61 from the outer fan casing 22 by means of a plurality of slender radial rods 74 which are pivotally secured at their inner ends to the stiffening ring 61 and at their outer ends are pivotally connected to a stiffening ring 76 on the outer fan casing 22. To this end the bridging member 70 of the stiffening ring is provided at each rod location about its periphery with two depending ears 78. Since all of the rods at the several locations are identical, only one has been shown and only one will be described. As shown in FIGURES 1 and 2, each rod 74 has an inner pivot pin 80 which extends through the ears 78 on the inner stiffening ring. At their outer ends the rods are pivotally supported by pins 82 and parallel ears 84 of a clevis bolt 86 which is screw threaded at its outer end at 88. The threaded portion 88 is threaded into a nut 90 provided with parallel side flanges 92 having bolt receiving apertures on opposite sides of the nut 90 to receive bolts 94 which extend through the parallel annular ring members 96. The latter extend about the outer fan casing and provide the stiffening ring thereon from which the rods 74 are supported. The ring members 96 are provided with annular outstanding flanges 98 for stiffening purposes. A lock nut 100 is provided for each rod 74 which is threaded on its clevis bolt 86 and bears against the nut 90 and secures the clevis bolt 86 rigidly to the nut 90. Where the rod 74 passes through the fan casing 22, an aperture 102 is provided which is slightly larger than a flange 104 formed on the rod. The purpose of the flange 104 is to enable the transition from the flat end portion of the rod which extends between the two ears 84 to the streamlined portion 106 which extends through the fan duct 24.

Where the rod 74 passes through the outer engine casing 16, a somewhat longer slot 108 is provided in the casing 16 to allow for a greater axial movement of the engine housing relative to the rod due to the temperature differential between the engine casing and the fan casing. At this point where the rod 74 passes through aperture 108, parallel pads 110 are provided on the rods which are a close fit between the sidewalls 112 of the slot 108 which are adapted to abut these sidewalls 112 in the event that transient compression forces are exerted on the rod. An axial slot 114 is provided in web 68 on the weldment member 60 at the inner end of the rod to accommodate relative movement.

In the turbine discharge passage 18 between the inner casing and the outer engine casing the rod 74 is enclosed in a streamlined housing 116 shown most clearly in FIG. 3. This member is of airfoil shape and includes a leading edge portion 118 and a trailing edge portion 120 connected by internal webs 122 and 123. The leading edge portions 118, including the internal web 122, are extended inwardly through an aperture 124 and are welded to the depending flange 126 on weldment 60 and defining duct 130 which forms a seal about rod 74. At its lower end this duct is welded to the outer engine casing 16 about aperture 108.

Cooling air may be supplied from the inside of the main engine shaft 10 through an aperture 132 into a chamber 134 in the weldment member 58 through an aperture 136 in this weldment and an aperture 138 in the inner bridging member 70 of the inner stiffening ring. From within the ring this cool air flows through aperture 114 into the duct 130. From the duct 130 the cooling air passes through apertures 108 into the fan duct 24. It will be evident that under some circumstances the pressure relationship will be such that fan duct air may be used, in which case the circulation will be the reverse of that described.

It will be noted that the bearing housing 38, due to the holes 53 cut in its sidewalls 48 and 50, comprises in effect a plurality of peripherally arranged annular hairpin springs 54. This will be evident from an inspection of FIGS. 1, 5, and 6. In order to limit the movement of the bearing in any radial direction, stop means are provided. This means includes the radially outwardly extended flange 45 of cap member 42 which it will be recalled is bolted firmly to the inner sidewall 50 of the cylindrical cup-shaped bearing housing 38. This flange 45 extends outwardly toward the rim 56 of the outer sidewall 50 leaving a gap 142. If the radial movement of the bearing exceeds the amount of gap 142, the engagement of flange 45 and rim 56 will prevent further radial movement.

Rim 56 of the outer sidewall of the cup bearing housing has a few peripherally spaced notches 144 in its rearwardly directed flange 146, FIGS. 4 and 5, to receive an equal number of radial tangs 148 which are loosely received therein but which prevent destruction of the bearing housing due to excessive torque generated in the event of a bearing seizure.

In the utilization of the above-described structure the slender rods 74 are maintained in tension. This is accomplished by rotating the nut 90 with its flanges 92 onto the threaded portion 88 of the clevis bolt 86 until the bolt holes 95 in the flanges 92 are in alignment with the bolt holes in the ring members 96. The nut 90 is rotated in a right-hand direction through half a turn and the stiffening ring 76 on the outer casing 22 is jacked radially inward until the holes are again aligned and the through bolts 85, one on each side of the clevis bolt 86, are inserted through the members 96 and the flanges 92, as shown in FIG. 1. The lock nut 100 is then tightened to absorb any looseness in the thread, thus locking the nut 90 with rod 74 in the proper tension when the jack is removed.

The spring rate of the bearing is determined by the design of the cup-shaped bearing housing 38 and particularly by the amount of material removed from the sidewalls 48 and 50 in making the apertures 53.

In the particular engine illustrated three rods are utilized equally spaced about the periphery of the engine.

With these rods all in tension, the bearing is permitted a limited amount of radial movement under the restraint of the hairpin springs provided by the bearing housing. In the event that the radial forces exerted against the bearings are greater than normal, the flange 45 will engage the rim 56 of the outer sidewall of the bearing housing and thus provide a positive stop limiting further movement of the bearing. Likewise, in the event of a bearing seizure the tanks 148 will engage the sidewalls of slots 144 and thus prevent destructive movement of sidewall 48 relative to sidewall 50 of the bearing housing due to excessive torque forces.

In the event that transient forces should cause any of the rods 74 to be momentarily in compression, one of the pads 110 will engage an adjacent sidewall 112 of slot 108 and prevent buckling of the rod. It will be understood that due to the oval cross section of the rod there is no danger of the rods buckling in the axial direction.

From the above description it will be evident that as a result of this invention applicant has been enabled to adequately support the rear main bearing and engine cases from the outer fan duct casing 22 and thus has been enabled to maintain the fan duct 24 unencumbered by bearing support structure. Thus the outer engine casing 16 can be lighter because it does not have to take the bearing loads. Also means has been provided for obtaining the desired bearing spring rate and adequately safeguard the bearing against damage due to abnormal bearing loads. It will further be evident that means has been provided for cooling these rods in the vicinity of the turbine discharge gases. Further, it will be evident that simple and effective means has been provided for adjusting the tension of the radial bearing support rods so as to provide equal tension on these rods.

While only one embodiment of the invention is shown herein, it will be evident that numerous changes can be made in the construction and arrangement of the parts without departing from the scope of the appended claims:

I claim:

1. In a ducted fan gas turbine engine having an axial shaft, inner and outer engine cylindrical casings concentric with said shaft forming a turbine discharge passage, a bearing supporting said shaft, an outer fan casing concentric with said shaft spaced from said outer engine casing and forming with the latter a fan duct, said inner casing having a rigid inner ring providing support for said shaft bearing and engine cases, said outer fan casing having a rigid outer ring, a plurality of radial rods pivoted at their inner ends to said inner ring and at their outer ends to said outer ring, said rods being normally in tension, and resilient means between said inner ring and said bearing providing the selected spring rate for said bearing.

2. The gas turbine engine of claim 1, in which the resilient means comprises a cylindrical spring having a sidewall of hairpin configuration in axial cross section and in which the desired spring rate is achieved by removing metal from the sidewall of the cylindrical spring.

3. The gas turbine engine of claim 1 in which the resilient means comprises a cup-shaped member coaxial with the engine shaft having spaced inner and outer cylindrical sidewall members connected at one end, the inner ends of said rods being connected to the free end of the outer sidewall member and said bearing being retained by the free end of said inner sidewall member.

4. The gas turbine engine of claim 1 in which stop means are provided for limiting the radial movement of the resilient means.

5. The gas turbine engine of claim 3 in which stop means are provided for limiting the radial movement of the free end of the inner sidewall member of said cup-shaped member.

6. The gas turbine engine of claim 3 in which stop means are provided between the inner and outer sidewall members of the cup-shaped member for limiting relative circumferential movement therebetween due to torsional forces.

7. The gas turbine engine of claim 1 in which apertures are provided in the outer engine casing through which said rods extend, said apertures being sufficiently extensive in the fore and aft direction to allow for axial movement of the inner engine casing relative to the outer fan casing due to differential thermal expansion, the sides of said rods having a small clearance between the adjacent sidewalls of said apertures for preventing buckling of said rods under transient compression forces.

8. The gas turbine engine of claim 1 in which a streamlined heat shield is provided for enclosing each of the radial rods where they extend through the turbine discharge passage, and means for cooling said rods is provided including passage means communicating with the interior of said heat shields for circulating cooling air through said shields.

9. In a ducted fan gas turbine engine having an axial shaft, a bearing for supporting said shaft aft of said turbine, inner and outer engine cylindrical casings concentric with said shaft forming a turbine discharge passage, an outer fan casing concentric with said shaft and spaced from said outer engine casing to form with the latter a fan duct, and means for increasing the fan duct cross sectional area in the vicinity of the bearing support including means for supporting said bearing and engine casings from said outer casing, said latter means comprising a rigid inner ring on said inner casing adjacent and resiliently connected to said bearing, an outer ring on said outer fan casing and a plurality of radially extended rods pivotally secured at their opposite ends to said inner and outer rings.

10. In a ducted fan gas turbine engine, an axial shaft, a bearing supporting said shaft having inner and outer races, a cylindrical spring concentric with said shaft having a sidewall of hairpin shape in axial cross section, the inner leg of the hairpin carrying the outer bearing race, an inner cylindrical engine casing concentric with said shaft having a stiff inner supporting ring, said ring being connected wth the outer leg of said hairpin spring, stop means between the free arms of the spring for limiting radial deflection of said spring, an outer engine casing concentric with said shaft, an outer fan duct casing concentric with said shaft having a rigid outer ring, a plurality of radial rods pivotally connected at their inner ends to said inner ring and pivotally connected at their outer ends to said outer ring, means for maintaining said rods normally in tension, said outer engine casing having slots where said rods pass therethrough permitting fore and aft movement of said rods relative to said casing to accommodate fore and aft movements of said fan duct relative to said engine casing, and said rods and said slots having limited circumferential clearance for preventing buckling of said rods under transitory compressive loads.

References Cited by the Examiner

UNITED STATES PATENTS

| 2,616,662 | 11/1952 | Mierley | 253—39 |
| 2,692,724 | 10/1954 | McLeod | 230—116 |
| 2,724,621 | 11/1955 | Kenney. | |
| 2,829,014 | 4/1958 | May. | |
| 2,928,648 | 3/1960 | Haines et al. | 253—39 |
| 2,961,150 | 11/1960 | Pirtle | 253—78 X |

MARTIN P. SCHWADRON, *Primary Examiner.*

E. A. POWELL, Jr., *Assistant Examiner.*